United States Patent [19]

Gat

[11] Patent Number: 4,696,160
[45] Date of Patent: Sep. 29, 1987

[54] PRESSURE PUMP AND INJECTOR VALVE SYSTEM FOR LIQUID-PROPELLANT ENGINES

[75] Inventor: Nahum Gat, Los Angeles, Calif.

[73] Assignee: TRW Inc., Redondo Beach, Calif.

[21] Appl. No.: 734,005

[22] Filed: May 14, 1985

[51] Int. Cl.⁴ .............................................. F02K 9/00
[52] U.S. Cl. ........................................ 60/258; 60/259; 417/417; 417/493
[58] Field of Search .................. 60/257, 258, 259; 123/451, 449, 446, 467, 499; 417/416, 417, 490, 493

[56] References Cited

U.S. PATENT DOCUMENTS

| | | | |
|---|---|---|---|
| 2,547,174 | 4/1951 | Rogers | 417/493 X |
| 2,995,008 | 8/1961 | Fox | 60/259 X |
| 3,088,406 | 5/1963 | Horner | 60/259 X |
| 3,348,488 | 10/1967 | Wolff | 417/493 X |
| 3,408,816 | 11/1968 | Stein | 60/258 X |
| 3,709,639 | 1/1973 | Suda et al. | 417/493 |
| 3,742,701 | 7/1943 | Feemster et al. | 60/258 |
| 3,769,879 | 11/1973 | Lofquist, Jr. | 92/84 |
| 4,036,192 | 7/1977 | Nakayama | 123/467 |

Primary Examiner—Carlton R. Croyle
Assistant Examiner—Donald E. Stout
Attorney, Agent, or Firm—Noel F. Heal

[57] ABSTRACT

A liquid-propellant delivery system using low-pressure propellant storage tanks instead of heavier high-pressure tanks. Liquid propellant material is pumped from the low-pressure tanks by a solenoid-actuated high-pressure pump, and delivered to the rocket engine through a pressure-actuated injector valve.

3 Claims, 3 Drawing Figures

PRESSURE PUMP AND INJECTOR VALVE SYSTEM FOR LIQUID-PROPELLANT ENGINES

BACKGROUND OF THE INVENTION

This invention relates generally to liquid-propellant rocket engines and, more particularly, to liquid-propellant engines that develop relatively low thrusts, in a range less than 5 pounds (2.3 kg). Such engines are typically used in satellites for attitude control, and course correction or station keeping.

Liquid-propellant rocket engines may be of the bipropellant type, in which separate streams of fuel and oxidizer are injected into the engine, or of the monopropellant type, in which a single fuel stream is injected into the engine onto a catalyst bed. In the bipropellant engine, the fuel and oxidizer are injected from narrow-bore propellant lines as relatively narrow streams of liquid. The fuel and oxidizer lines are oriented in such a manner that the streams intersect in the combustion chamber of the engine.

In both types of engines, the liquid propellants are stored under pressure and fed to the engine through propellant lines. High-pressure propellant tanks add significantly to the weight of the vehicle in which they are installed. There is, therefore, a need for a liquid-propellant delivery system that avoids the use of high-pressure fuel tanks and oxidizer tanks. The present invention is directed to this end.

SUMMARY OF THE INVENTION

The present invention resides in a liquid-propellant delivery system including a high-pressure pump and a pressure-actuated injector valve. Briefly, and in general terms, the system comprises a solenoid-actuated high-pressure pump, for delivering quantities or bursts of high-pressure liquid propellant obtained from a low-pressure propellant storage tank, and a pressure-actuated injector valve installed in an inlet nozzle to a rocket engine combustion chamber, and coupled to the pump to receive the bursts of high-pressure liquid propellant.

More specifically, the injector valve in the presently preferred embodiment of the invention includes a valve body, having a propellant inlet port and a propellant outlet port in the form of a valve seat, a valve needle installed for sliding movement in the valve body, between a closed position engaging the valve seat and an open position lifted from the valve seat, and a return spring positioned to urge the valve needle into engagement with the valve seat. The propellant inlet port, or nozzle, is located to apply propellant pressure to lift the valve needle from the valve seat, injecting the propellant through the injector valve in a fine spray.

The high-pressure pump of the preferred embodiment includes a generally cylindrical pump body having an axial passage through it, an inlet port at one end of the axial passage, for connection to the low-pressure propellant tank, a first outlet port for connecting the axial passage to the injector valve, and a second outlet port for connecting the axial passage with a return line. A hollow plunger is mounted for sliding movement within the axial passage, and the pump further includes a solenoid for moving the plunger axially in a forward stroke in the pump body, a one-way check valve connected to prevent reverse flow through the inlet port and permit pressure to rise during the forward stroke, and a return spring for moving the plunger in a return stroke in the pump body. Finally, the pump includes means for coupling high-pressure fluid within the plunger to the first outlet port during the forward stroke, and means for venting the high-pressure fluid to the second outlet port at the end of the forward stroke.

In the specific embodiment disclosed, the means for coupling the high-pressure fluid to the first outlet port includes a front chamber defined by an enlarged-diameter region of the axial passage, the first outlet port being in fluid communication with the front chamber, and a first radial passage through the plunger wall. On the forward stroke, pressure within the plunger increases until the first radial passage reaches the forward chamber, after which the high pressure is transferred through the radial passage and to the first outlet port. The means for venting the high pressure through the second outlet port includes a rear chamber defined by another enlarged-diameter region of the axial passage, the second outlet port being in fluid communication with the rear chamber, and a second radial passage in the plunger, positioned to communicate with the rear chamber as the plunger reaches the end of its forward stroke, thereby venting the high pressure in the plunger through the second outlet port.

In terms of a novel method, the invention includes the steps of actuating the pump solenoid, moving the plunger in its forward storke, and thereby pumping a quantity of propellant at high pressure to the injector valve. The method further includes the steps of lifting the injector valve from its seat, injecting a quantity of propellant into the rocket engine, and returning the pump plunger and the injector valve to their starting positions.

It will be appreciated from the foregoing that the present invention represents a significant advance in the field of liquid-propellant rocket engines. In particular, the use of an electrically-actuated pump and a pressure-actuated injector valve avoid the use of relatively heavy high-pressure propellant tanks. Other aspects and advantages of the invention will become apparent from the following more detailed description, taken in conjunction with the accompanying drawings.

DESCRIPTION OF THE PREFERRED EMBODIMENT

Figure 1:
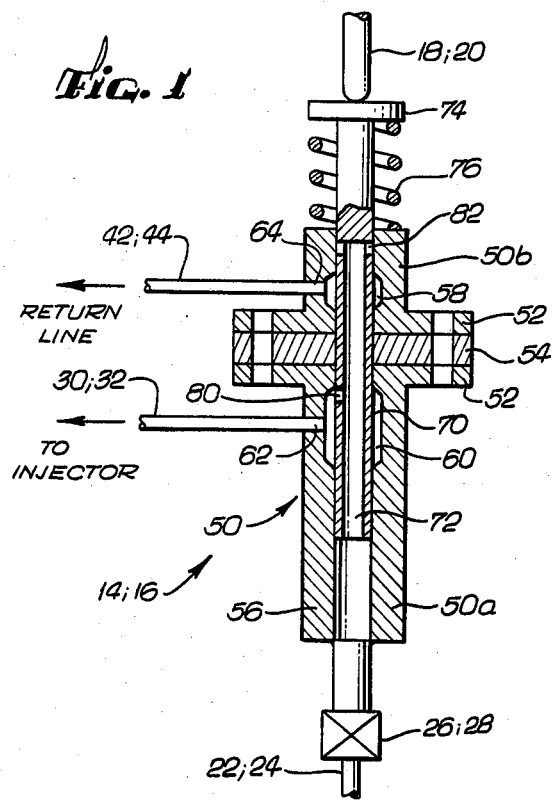
FIG. 1 is an elevational view, partly in section, of a solenoid actuated pump employed in the invention.

As shown in the drawings for purposes of illustration, the present invention is concerned with liquid-propellant rocket engines, and with an improved technique of propellant delivery employing low-pressure propellant tanks. High-pressure tanks are heavier and more costly, but have been traditionally employed on space vehicles with liquid-propellant engines.

Figure 3:
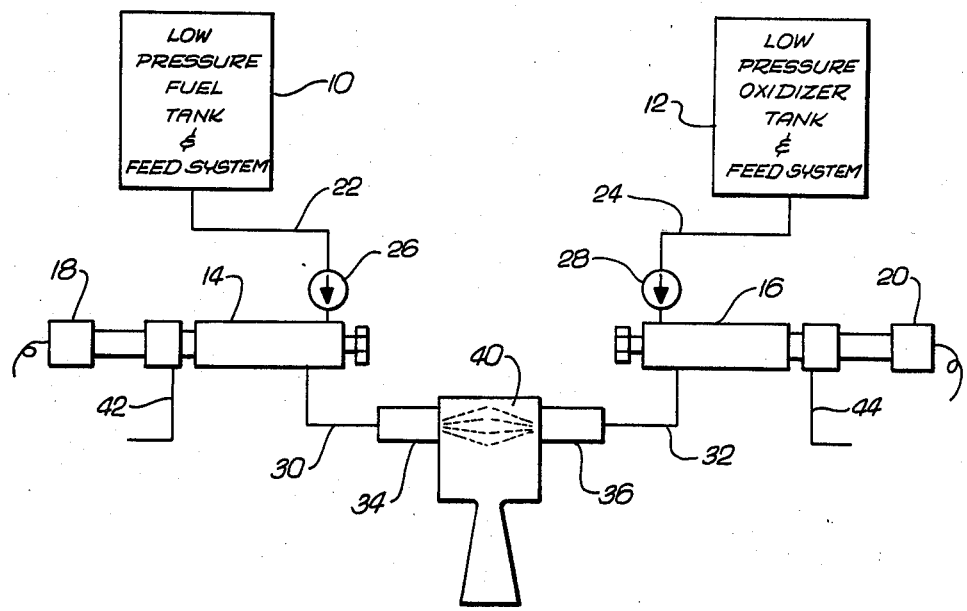
FIG. 3 is a schematic diagram of a bipropellant rocket engine in accordance with the invention.

In accordance with the invention, and as shown in FIG. 3, low-pressure fuel and oxidizer tanks, indicated by reference numerals 10 and 12, are used in conjunction with high-pressure pumps 14 and 16, actuated by solenoids 18 and 20. Propellants from the tanks 10 and 12 reach the pumps 14 and 16 through lines 22 and 24, which have check valves 26 and 28 installed to prevent reverse flow back to the tanks. The pumps 14 and 16 generate pulses of high pressure on lines 30 and 32, which are connected to pressure-actuated injector valves 34 and 36. The injector valves 34 and 36 are coupled to inlet ports of a rocket combustion chamber 40, to inject the fuel and oxidizer as fine sprays. The pumps 14 and 16 have second outlet lines 42 and 44, these being return lines connected back to the corresponding low-pressure storage tanks 10 and 12.

FIG. 1 shows the structure of each of the pumps 14 and 16 in detail. Each pump includes a generally cylindrical pump body 50, having a front portion 50a and a rear portion 50b. The two portions have flanges 52, which are secured together and separated by a spacer 54, the thickness of which may be selected to control the stroke of the pump. The pump body 50 has an axial passage 56 through its entire length. The axial passage 56 is of uniform diameter except for a rear chamber 58 of enlarged diameter and a front chamber 60 of enlarged diameter. The inlet line 22 or 24 from the low-pressure tank 10 or 12 is coupled to the forward end of the axial passage 56, and there are two outlet ports 62 and 64 in the pump body. The first outlet port 62 communicates with the front chamber 60 and is coupled to one of the lines 30 and 32 to the injector pumps. The second outlet port 64 communicates with the rear chamber 58 and is coupled to one of the return lines 42 and 44.

The pump further includes a hollow plunger 70 dimensioned for a sliding fit within the axial passage 56. The plunger has an axial bore 72 extending over most of its length, from an open forward end to a closed end within the plunger. The plunger 70 extends out through the rear portion 50b of the pump body 50 and has an end flange 74, which is engaged by one of the solenoids 18 and 20. Solenoid actuation drives the plunger 70 in a forward direction, to perform the forward pump stroke, and a return spring 76 located between the flange 74 and the pump body 50 subsequently moves the plunger in its return stroke.

In operation, the pump in its forward stroke pressurizes liquid within the plunger 70, since the check valve 26 or 28 prevents reverse flow. As the plunger 70 continues in its forward stroke, a radial passage 80, appropriately located in the plunger wall, reaches the front chamber 60 and communicates the high pressure within the plunger to the chamber, and thence to the injector line 30 or 32. Further forward movement of the plunger 70 pumps the liquid to the injector valve 34 or 36, and this action continues until the end of the forward stroke, at which time another radial passage 82 at the closed end of the plunger bore 72, reaches the rear chamber 58. At this point, the high-pressure liquid within the plunger 70 is vented out through the second outlet port 64 and into the return line 42 or 44. On the return stroke, liquid is drawn into the pump body from the low-pressure tank 10 or 12.

Figure 2:
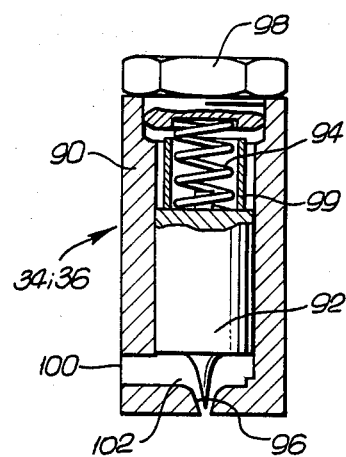
FIG. 2 is an elevational view, partly in section, of an injector valve used in conjunction with the pump of FIG. 1.

Each of the injector valves 34 and 36 is shown in detail in FIG. 2, including a valve body 90, a valve needle 92, and a return spring 94. The valve body 90 is a hollow cylinder having one closed end in which is formed a tapered valve seat 96, providing an outlet from the injector body. The opposite end of the body 90 is closed by means of a plug 98, and the return spring 94 is disposed between the plug and the top of the valve needle 92. A sleeve 99 installed around the spring 94 determines the maximum displacement of the needle 92 from the valve seat 96. High-pressure propellant is supplied to the injector valve 34 or 36 through an inlet port 100 that communicates with a small space 102 between the valve needle 92 and the closed end of the valve body 90. When the pressure of liquid applied to the inlet port 100 reaches a selected threshold, the valve needle 92 is lifted from the valve seat 98, and the liquid propellant is injected around the tapered needle and into the combustion chamber 40 of the rocket engine. When the pressure is released, during the return stroke of the pump, the return spring 94 urges the needle 92 back into engagement with the valve seat 96.

It will be appreciated from the foregoing that the present invention represents a significant advance in liquid-propellant engines. In particular, the invention eliminates the need for high-pressure propellant tanks. Instead, liquid fuel or oxidizer is drawn from a low-pressure storage tank, pressurized in a solenoid-actuated pump, and supplied to a pressure-actuated injector valve. It will also be appreciated that, although a specific embodiment of the invention has been described in detail for purposes of illustration, various modifications may be made without departing from the spirit and scope of the invention. Accordingly, the invention is not to be limited except as by the appended claims.

I claim:

1. A propellant delivery system for use in a liquid-propellant rocket, the system comprising:
    a solenoid-actuated high-pressure pump, for delivering bursts of high-pressure liquid propellant obtained from a low-pressure propellant storage tank; and
    a pressure-actuated injector valve installed in an inlet nozzle to a rocket engine combustion chamber, and coupled to the pump to receive the bursts of high-pressure liquid propellant, and to atomize the propellant as it enters the combustion chamber;
    and in which the high-pressure pump includes
        a generally cylindrical pump body having an axial passage through it, an inlet port at one end of the axial passage, for connection to the low-pressure propellant tank, a first outlet port for connecting the axial passage to the injector valve, and a second outlet port for connecting the axial passage with a return line,
        a hollow plunger mounted for sliding movement within the axial passage,
        a solenoid for moving the plunger axially in a forward stroke in the pump body,
        a one-way check valve connected to prevent reverse flow through the inlet port and permit pressure to rise during the forward stroke,
        a return spring for moving the plunger in a return stroke in the pump body,
        means for coupling the high-pressure fluid within the plunger to the first outlet port during the forward stroke, and
        means for venting the high-pressure fluid to the second outlet port at the end of the forward stroke.

2. A propellant delivery system as defined in claim 1, in which the means for coupling the high-pressure fluid includes:
    a front chamber defined by an enlarged-diameter region of the axial passage, the first outlet port being in fluid communication with the front chamber; and
    a radial passage through the plunger wall;

whereby, on the forward stroke, pressure within the plunger is increased until the radial passage reaches the forward chamber, after which the high pressure is transferred through the radial passage and through the first outlet port.

3. A propellant delivery system as defined in claim 2, in which the means for venting the high pressure includes:

a rear chamber defined by another enlarged-diameter region of the axial passage, the second outlet port being in fluid communication with the rear chamber; and a second radial passage in the plunger, positioned to communicate with the rear chamber as the plunger reaches the end of its forward stroke, thereby venting the high pressure in the plunger through the second outlet port.

* * * * *